United States Patent
Sun et al.

(10) Patent No.: US 9,705,158 B2
(45) Date of Patent: Jul. 11, 2017

(54) RECHARGEABLE BATTERY COMPRISING NON-AQUEOUS ELECTROLYTIC SOLUTION USING ALKYL METHANESULFONATE AS SOLVENT FOR DISSOLVING ELECTROLYTIC SALT

(71) Applicant: IUCF-HYU(INDUSTRY-UNIVERSITY COOPERATION FOUNDATION HANYANG UNIVERSITY), Seoul (KR)

(72) Inventors: Yang Kook Sun, Seoul (KR); Seung Min Oh, Gumi-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 14/648,136

(22) PCT Filed: Nov. 28, 2013

(86) PCT No.: PCT/KR2013/010931
§ 371 (c)(1),
(2) Date: May 28, 2015

(87) PCT Pub. No.: WO2014/084642
PCT Pub. Date: Jun. 5, 2014

(65) Prior Publication Data
US 2015/0318576 A1    Nov. 5, 2015

(30) Foreign Application Priority Data

Nov. 28, 2012 (KR) .......................... 10-2012-0135848

(51) Int. Cl.
*H01M 4/131* (2010.01)
*H01M 4/133* (2010.01)
(Continued)

(52) U.S. Cl.
CPC ....... *H01M 10/0569* (2013.01); *H01M 4/131* (2013.01); *H01M 4/133* (2013.01);
(Continued)

(58) Field of Classification Search
CPC ..... H01M 2300/0028; H01M 10/0525; H01M 10/0567; H01M 10/0569; H01M 4/131;
(Continued)

(56) References Cited

U.S. PATENT DOCUMENTS

| 4,528,254 A | 7/1985 | Wolf et al. |
| 2004/0110068 A1 | 6/2004 | Seki et al. |

(Continued)

FOREIGN PATENT DOCUMENTS

| JP | 2010225525 A | 10/2010 |
| KR | 1020060063035 A | 6/2006 |

(Continued)

OTHER PUBLICATIONS

International Search Report dated Apr. 4, 2014 for PCT/KR2013/010931 and English translation.

*Primary Examiner* — Brittany Raymond
(74) *Attorney, Agent, or Firm* — Lucas & Mercanti, LLP

(57) ABSTRACT

The present invention relates to a rechargeable battery comprising a non-aqueous electrolytic solution using an alkyl methanesulfonate as a solvent for dissolving the electrolytic salt, and can improve the life characteristics of the battery at high temperature and the high-temperature performance.

6 Claims, 3 Drawing Sheets

(51) Int. Cl.
  *H01M 4/136*   (2010.01)
  *H01M 4/485*   (2010.01)
  *H01M 4/58*    (2010.01)
  *H01M 4/587*   (2010.01)
  *H01M 10/0525* (2010.01)
  *H01M 10/0567* (2010.01)
  *H01M 10/0569* (2010.01)
  *H01M 10/052*  (2010.01)
  *H01M 4/02*    (2006.01)

(52) U.S. Cl.
  CPC ........... *H01M 4/136* (2013.01); *H01M 4/587* (2013.01); *H01M 10/052* (2013.01); *H01M 10/0525* (2013.01); *H01M 10/0567* (2013.01); *H01M 4/485* (2013.01); *H01M 4/5825* (2013.01); *H01M 2004/027* (2013.01); *H01M 2004/028* (2013.01); *H01M 2300/0028* (2013.01); *Y02T 10/7011* (2013.01)

(58) Field of Classification Search
  CPC ...... H01M 4/133; H01M 4/136; H01M 4/485; H01M 4/5825; H01M 4/587; H01M 2004/027; H01M 2004/028; Y02E 60/122; Y02T 10/7011
  See application file for complete search history.

(56) References Cited

U.S. PATENT DOCUMENTS

| | | | | |
|---|---|---|---|---|
| 2010/0119956 | A1* | 5/2010 | Tokuda | H01M 4/134 429/338 |
| 2010/0261051 | A1* | 10/2010 | Okada | H01M 10/054 429/188 |
| 2011/0229773 | A1* | 9/2011 | Cho | H01M 10/052 429/338 |

FOREIGN PATENT DOCUMENTS

| | | |
|---|---|---|
| KR | 20100009587 A | 1/2010 |
| KR | 20100120238 A | 11/2010 |
| KR | 20110093743 A | 8/2011 |
| KR | 20120083290 A | 7/2012 |
| KR | 20120084709 A | 7/2012 |
| KR | 20120092918 A | 8/2012 |

* cited by examiner

[Fig. 1]
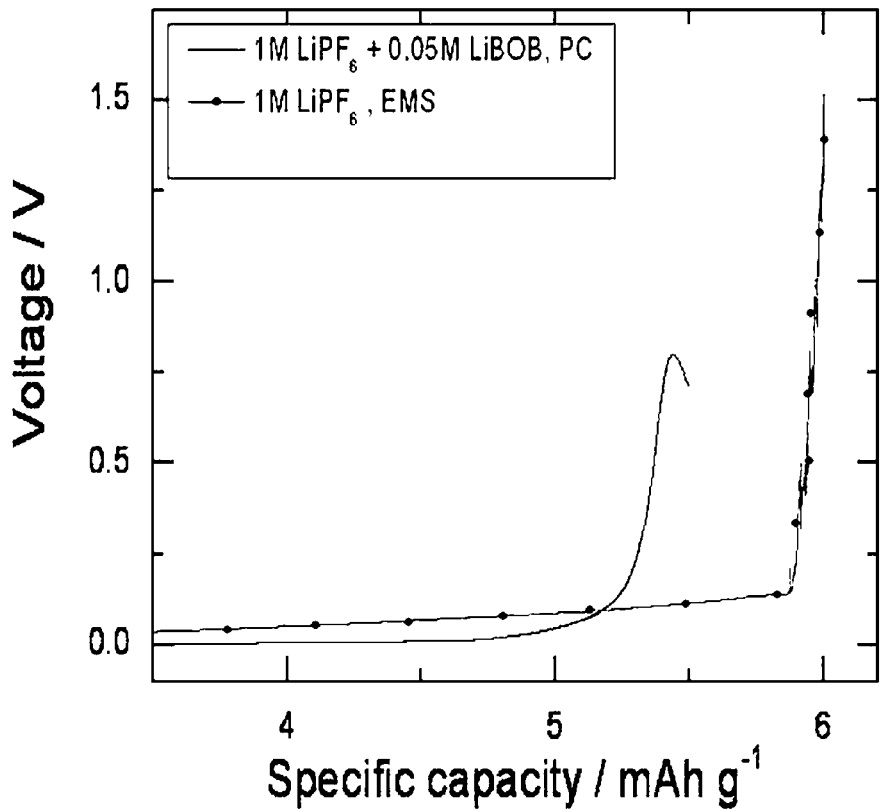
[Fig. 2]
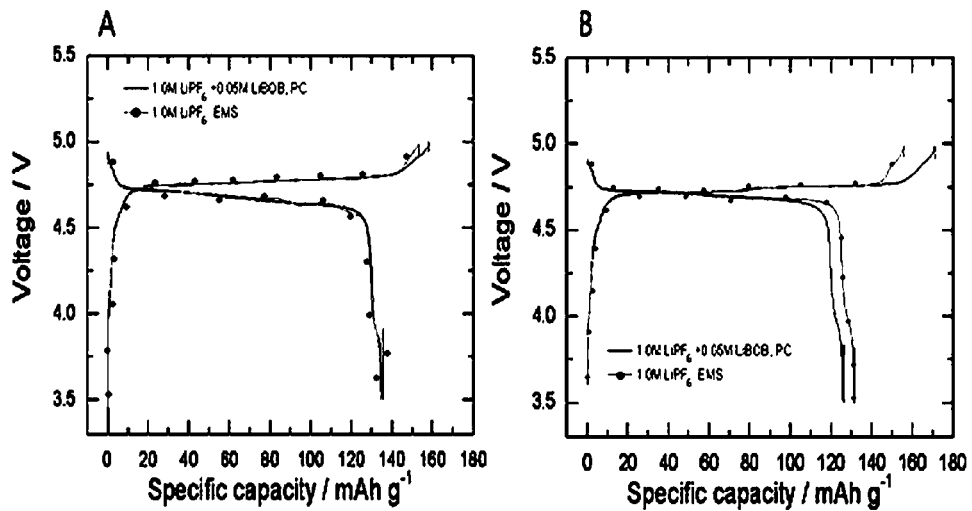

[Fig. 3]
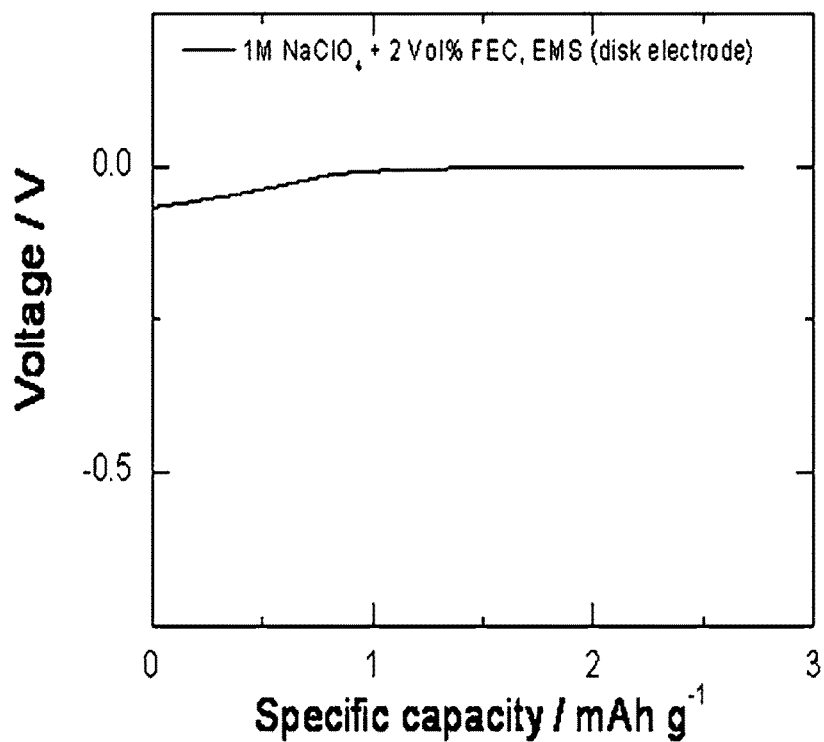
[Fig. 4]
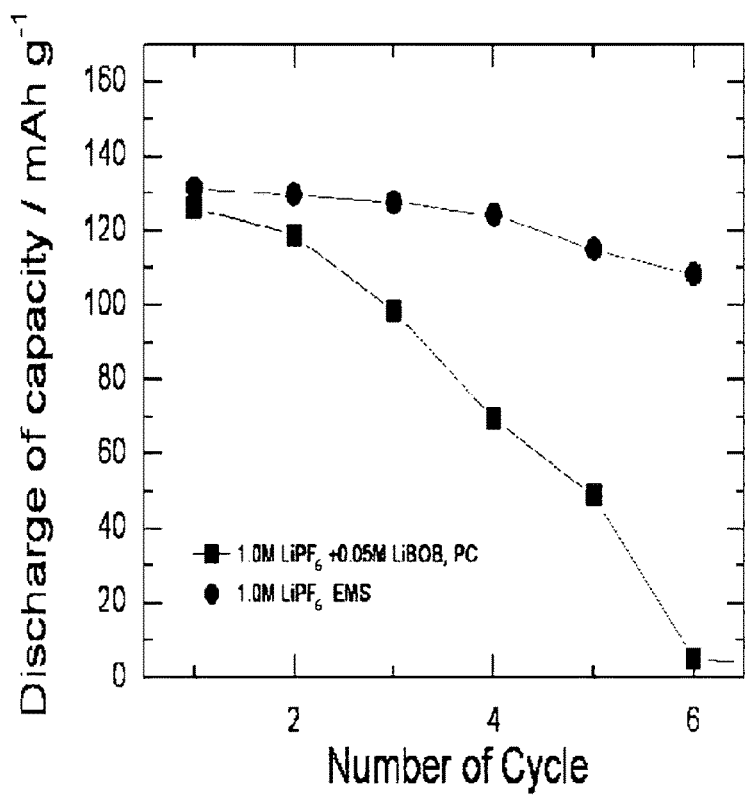

[Fig. 5]
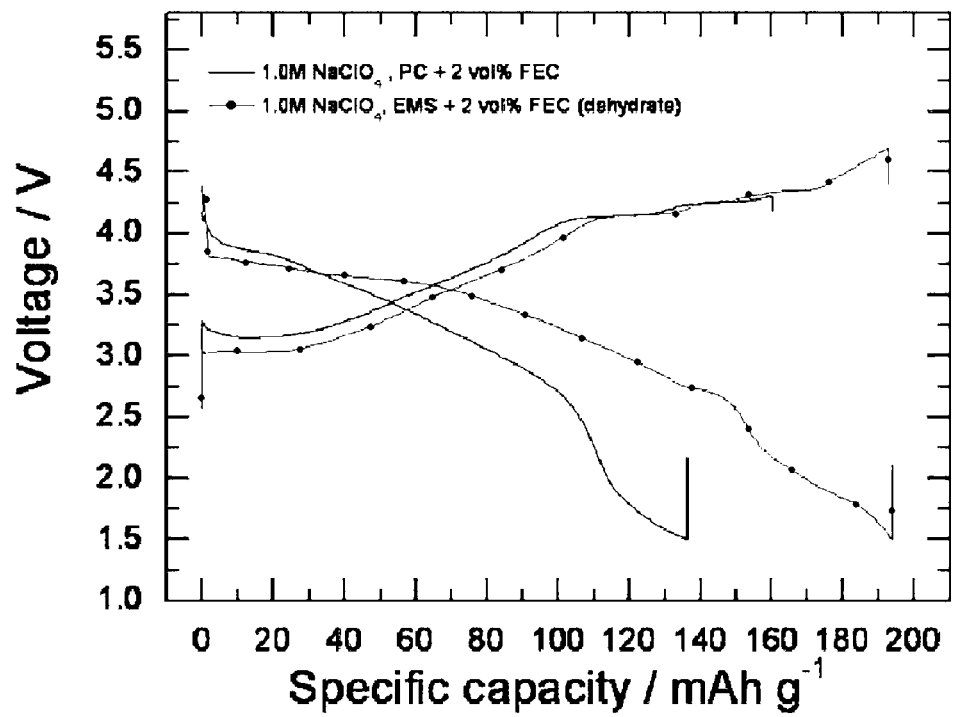
[Fig. 6]
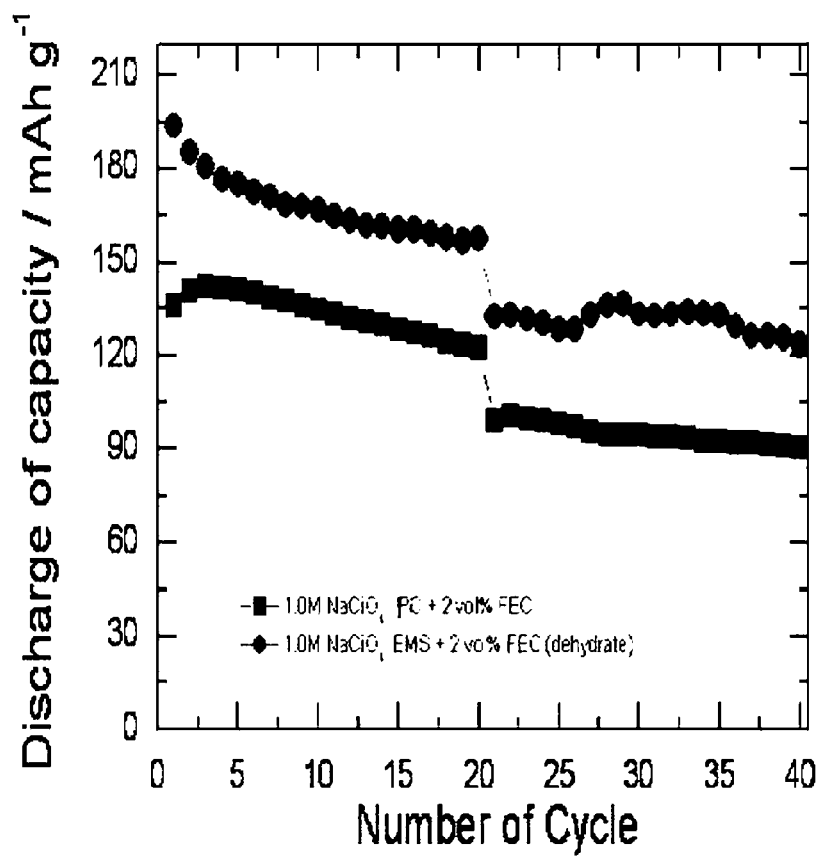

RECHARGEABLE BATTERY COMPRISING NON-AQUEOUS ELECTROLYTIC SOLUTION USING ALKYL METHANESULFONATE AS SOLVENT FOR DISSOLVING ELECTROLYTIC SALT

CROSS-REFERENCE TO RELATED APPLICATIONS

This application is a 371 of PCT/KR2013/010931, filed Nov. 28, 2013, which claims the benefit of Korean Patent Application No. 10-2012-0135848, filed Nov. 28, 2012, the contents of each of which are incorporated herein by reference.

TECHNICAL FIELD

The present invention relates to a rechargeable battery containing a non-aqueous electrolytic solution using an alkyl methanesulfonate as a solvent for dissolving an electrolytic salt.

BACKGROUND ART

Recently, a lithium rechargeable battery tends to increase in size from a compact rechargeable battery used in a notebook computer and a cellular phone to a rechargeable battery for an electric vehicle and a hybrid electric vehicle. Such a battery for an electric vehicle is used outdoors and thus is desired to be less sensitive to the temperature change. In particular, an output at a high temperature and/or a low temperature is important. Such an output at a high temperature and/or a low temperature depends on the physical properties of the electrolytic solution in many cases, and this is because the viscosity of the solvent rapidly increases when the temperature decreases to near a certain point of the solvent of electrolyte and thus the mobility of the ions significantly decreases.

The rechargeable batteries including a lithium rechargeable battery are composed of a cathode, an anode, an electrolyte and a separator. During discharging, the lithium ion is removed to cause an oxidation reaction in the anode and the lithium ion is intercalated to cause a reduction reaction in the cathode. During charging, the lithium ion is removed to cause an oxidation reaction in the cathode and the lithium ion is intercalated to cause a reduction reaction in the anode. The electrolyte does not exhibit conductivity for an electron but exhibits only ionic conductivity and plays a role to deliver the lithium ion between the cathode and the anode.

Although the primary performance such as the operating voltage and the energy density of the lithium rechargeable battery is determined by the materials constituting the cathode and the anode, the electrolyte is required to be equipped with high ionic conductivity, electrochemical stability, thermal stability and the like in order to obtain excellent battery performance. An electrolytic salt and an organic solvent are used as the components constituting the electrolyte. The electrolyte is required to be electrochemically stable in the potential region corresponding to the reduction potential and the oxidation potential in consideration of the reduction reaction with the anode and the oxidation reaction with the cathode.

The organic solvent is required to be equipped with low reactivity with lithium, a minimized internal resistance for smooth transfer of the lithium ion, thermal stability in a wide range of temperature, high compatibility with the anode active material and a dielectric constant that is high enough to dissolve a great amount of a lithium salt. Hitherto, as such an organic solvent, a cyclic carbonate such as propylene carbonate (PC) and ethylene carbonate (EC); or a linear carbonate such as dimethyl carbonate (DMC) and diethyl carbonate (DEC) has been mainly used, in addition a hydrocarbon-based solvent such as 1,2-dimethoxyethane and diethoxyethane has been used.

However, PC is highly viscous and has a problem that it is intercalated between the carbon layers of the anode and decomposes to produce propylene gas and lithium carbonate during charging when it is used together with a crystalline carbon-based anode active material such as graphite, and the battery capacity decreases and the irreversible capacity of battery increases as a result. In addition, the linear carbonate such as DMC and DEC is less viscous, easily intercalated between the anode active materials to decrease the irreversible capacity of battery, and less reactive with lithium, but has a disadvantage that it is not able to dissolve a great amount of a lithium salt since it has a low dielectric constant. In particular, DMC is expected to be used in a high-current and high-voltage battery since it exhibits high electrical conductivity, but it is poor in low temperature characteristics since it has a high melting point (4.6° C.). In addition, an organic solvent such as dimethylformamide and acetonitrile has a high dielectric constant but is highly reactive with lithium, and thus there is a problem that it is practically difficult to use an organic solvent.

Meanwhile, the characteristics required to the non-aqueous electrolytic solution for a lithium rechargeable battery have been stricter year after year. As one of such properties required, it is required to solve the problem of securing stability at a high temperature and stability at the time of being overcharged (for example, nonflammability or fracture resistance). This is because a lithium rechargeable battery for an electric vehicle and power storage is often exposed to an external high-temperature environment, the temperature of the battery may increase by instantaneous charge and discharge, and thus the lifespan of the battery may be shortened in such a high-temperature and high-voltage environment and the quantity of energy stored may decrease.

DISCLOSURE OF THE INVENTION

Technical Problem

An object of the present invention is to provide a rechargeable battery which contains a solvent for dissolving an electrolytic salt and exhibits excellent capacity characteristics and lifespan characteristics under a high-temperature and high-voltage condition in order to solve the technical problem of the related art as described above.

Technical Solution

The present invention provides a rechargeable battery including a cathode; a carbon-based anode; and a non-aqueous electrolytic solution containing an electrolytic salt and an alkyl methanesulfonate as a solvent for dissolving the electrolytic salt in order to achieve the object as described above.

In the present invention, the alkyl methanesulfonate is methyl methanesulfonate, ethyl methanesulfonate, propyl methanesulfonate, butyl methanesulfonate and pentyl methanesulfonate. The alkyl methanesulfonate-based solvent of the present invention can improve the battery characteristics at a high voltage and a high temperature.

In the present invention, the concentration of the electrolytic salt is from 0.5 M to 1.2 M. The conductivity of the electrolytic solution decreases and thus the performance of the electrolytic solution decreases when the concentration of the electrolytic salt is less than 0.5 M, and the viscosity of the electrolytic solution increases and thus the performance of the electrolytic solution decreases when the concentration of the electrolytic salt is more than 1.2 M.

In the present invention, the cathode is a lithium intercalation compound, has a structure selected from the group consisting of a layered structure, a spinel structure, an olivine structure and a nasicon structure, and is one or more selected from the group consisting of chemical formulas of $Li_aNi_{1-b-c}Co_bX_cO_{2-\alpha}T_\alpha$ ($0.90 \leq a \leq 1.3$, $0 \leq b \leq 1.0$, $0 \leq c \leq 0.1$, $0 \leq \alpha \leq 2$); $Li_aNi_{1-b-c}Mn_bX_cO_{2-\alpha}T_\alpha$ ($0.90 \leq a \leq 1.3$, $0 \leq b \leq 1.0$, $0 \leq c \leq 0.1$, $0 \leq \alpha \leq 2$); $Li_aNi_bCo_cMn_dG_eO_2$ ($0.90 \leq a \leq 1.3$, $0 \leq b \leq 1.0$, $0 \leq c \leq 1.0$, $0 \leq d \leq 1.0$, $0 \leq e \leq 0.1$); $Li_aCoG_bO_2$ ($0.90 \leq a \leq 1.3$, $0 \leq b \leq 0.1$); $Li_aMn_{1-b}G_bO_2$ ($0.90 \leq a \leq 1.3$, $0 \leq b \leq 0.1$); $Li_aMn_{2-b-c}Ni_bG_cO_4$ ($0.90 \leq a \leq 1.3$, $0 \leq b \leq 1.0$, $0 \leq c \leq 1.0$); $Li_aMn_2G_bO_4$ ($0.90 \leq a \leq 1.3$, $0 \leq b \leq 0.1$); $Li_aMn_{1-g-f}G_gX_fPO_4$ ($0.90 \leq a \leq 1.3$, $0 \leq g \leq 1.0$, $0 \leq f \leq 1.0$); $Li_{(3-f)}J_2(PO_4)_3$ ($0 \leq f \leq 2$); $Li_{(3-f)}Fe_2(PO_4)_3$ ($0 \leq f \leq 2$); and $Li_aFe_{1-g}G_gX_fPO_4$ ($0.90 \leq a \leq 1.3$, $0 \leq g \leq 1.0$, $0 \leq f \leq 1.0$), and in the chemical formulas, X is selected from the group consisting of Al, Ni Co, Mn, Cr, Fe, Mg, Sr, V, a rare earth element and any combination thereof; T is selected from the group consisting of F, S, P and any combination thereof; G is selected from the group consisting of Al, Cr, Mn, Fe, Mg, La, Ce, Sr, V and any combination thereof; Z is selected from the group consisting of Cr, V, Fe, Sc, Y and any combination thereof; and J is selected from the group consisting of V, Cr, Mn, Co, Ni, Cu and any combination thereof.

The electrolytic salt is one or more selected from the group consisting of $LiPF_6$, $LiBF_4$, $LiSbF_6$, $LiAsF_6$, $LiClO_4$, $LiN(C_2F_5SO_2)_2$, $LiC_4F_9SO_3$, $LiN(CF_3SO_2)_2$, $LiCF_3SO_3$, $LiC(CF_3SO_2)_3$, $LiAlO_4$, $LiAlO_2$, $LiAlCl_4$, LiCl and LiI.

In the present invention, the cathode is a sodium ion intercalation compound, may be a sodium transition metal oxide, and is selected from the group consisting of chemical formulas of $Na_aNi_{1-b-c}Co_bX_cO_{2-\alpha}T_\alpha$ ($0.30 \leq a \leq 1.3$, $0 \leq b \leq 1.0$, $0 \leq c \leq 0.1$, $0 \leq \alpha \leq 2$); $Na_aNi_{1-b-c}Mn_bX_cO_{2-\alpha}T_\alpha$ ($0.30 \leq a \leq 1.3$, $0 \leq b \leq 1.0$, $0 \leq c \leq 0.1$, $0 \leq \alpha \leq 2$); $Na_aNi_bCo_cMn_dG_eO_2$ ($0.30 \leq a \leq 1.3$, $0 \leq b \leq 1.0$, $0 \leq c \leq 1.0$, $0 \leq d \leq 1.0$, $0 \leq e \leq 0.1$); $Na_aCoG_bO_2$ ($0.30 \leq a \leq 1.3$, $0 \leq b \leq 0.1$); $Na_aMn_{1-b}G_bO_2$ ($0.30 \leq a \leq 1.3$, $0 \leq b \leq 0.1$); $Na_aMn_2G_bO_4$ ($0.30 \leq a \leq 1.3$, $0 \leq b \leq 0.1$); $Na_aMn_{1-g-f}G_gX_fPO_4$ ($0.90 \leq a \leq 1.3$, $0 \leq g \leq 1.0$, $0 \leq f \leq 1.0$); $Na_{(3-f)}J_2(PO_4)_3$ ($0 \leq f \leq 2$); $Na_{(3-f)}Fe_2(PO_4)_3$ ($0 \leq f \leq 2$); and $Na_aFe_{1-g}G_gX_fPO_4$ ($0.90 \leq a \leq 1.3$, $0 \leq g \leq 1.0$, $0 \leq f \leq 1.0$) (in the chemical formulas, X is selected from the group consisting of Al, Ni Co, Mn, Cr, Fe, Mg, Sr, V, a rare earth element and any combination thereof; T is selected from the group consisting of F, S, P and any combination thereof; G is selected from the group consisting of Al, Cr, Mn, Fe, Mg, La, Ce, Sr, V and any combination thereof; Z is selected from the group consisting of Cr, V, Fe, Sc, Y and any combination thereof; and J is selected from the group consisting of V, Cr, Mn, Co, Ni, Cu and any combination thereof.).

The electrolytic salt is one or more selected from the group consisting of $NaClO_4$, $NaBF_4$, $NaAlCl_4$, $NaSbF_6$, $NaPF_6$, NaSCN, $NaCF_3SO_3$, $NaCF_3CO_2$, $NaAsF_6$, $NaB_{10}Cl_{10}$, NaCl, NaBr and NaI.

The rechargeable battery according to the present invention further includes an additive selected from the group consisting of fluoroethylene carbonate ($C_3H_3FO_3$), vinyl carbonate, vinyl benzoate, vinyl butyrate, vinyl hexanoate, vinyl crotonate, vinyl pivalate, t-difluoroethylene carbonate (DFEC) and ethylene sulfite (ES).

Advantageous Effects

The rechargeable battery according to the present invention contains an alkyl methanesulfonate as a solvent for dissolving an electrolytic salt and thus exhibits high energy storability and a long lifespan effect even in a high-voltage and high-temperature environment.

BRIEF DESCRIPTION OF THE DRAWINGS

FIG. 1 shows a graph illustrating the LSV test result of a lithium rechargeable battery according to an embodiment of the present invention at a high voltage.

FIG. 2 shows a graph illustrating the LSV test result of a sodium rechargeable battery according to an embodiment of the present invention at a low voltage.

FIG. 3 shows a graph illustrating the voltage-capacity of a lithium rechargeable battery according to an embodiment of the present invention.

FIG. 4 shows a graph illustrating the lifespan characteristics of a lithium rechargeable battery according to an embodiment of the present invention at a high temperature.

FIG. 5 shows a graph illustrating the voltage-capacity of a sodium rechargeable battery according to an embodiment of the present invention.

FIG. 6 shows a graph illustrating the lifespan characteristics of a sodium rechargeable battery according to an embodiment of the present invention.

BEST MODE FOR CARRYING OUT THE INVENTION

Hereinafter, the present invention will be described in more detail with reference to exemplary embodiments. However, the present invention is not limited to the following exemplary embodiments.

[Embodiment 1] Manufacture of Lithium Rechargeable Battery

[Embodiment 1-1]

The slurry of anode active material was prepared by mixing modified natural graphite of the anode active material, styrene butadiene rubber of the binder and carboxymethyl cellulose of the thicker in water at a weight ratio of 75:15:10. The anode was fabricated by a typical process to coat this slurry of anode active material on Cu foil of the current collector, to dry and to roll.

The slurry of cathode active material was prepared by mixing $Li[Ni_{0.4}Fe_{0.1}Mn_{1.45}]O_4$ of the cathode active material, carbon black of the electrically conductive material and polyvinylidene fluoride of the binder in N-methylpyrrolidone of the solvent at a weight ratio of 85:7.5:7.5. The cathode was fabricated by a typical process to coat this slurry of cathode active material on Al foil of the current collector, to dry and to roll.

A lithium rechargeable battery having a size of CR2032 was manufactured using the cathode, the anode and an electrolytic solution prepared by dissolving 1 M of $LiPF_6$ of the electrolytic salt in ethyl methanesulfonate of the solvent.

[Embodiment 1-2]

A lithium rechargeable battery was manufactured in the same manner as in Embodiment 1-1 except using $Li[Ni_{0.5}Mn_{1.5}]O_4$ as the cathode active material.

COMPARISON EXAMPLE 1-1

A lithium rechargeable battery was manufactured in the same manner as in Embodiment 1-1 except using a propyl carbonate prepared by dissolving 0.05 M of LiBOB (Lithium bis-(oxalate)borate) and 1 M of $LiPF_6$ as the electrolytic solution.

COMPARISON EXAMPLE 1-2

A lithium rechargeable battery was manufactured in the same manner as in Embodiment 1-2 except using a propyl carbonate prepared by dissolving 0.05 M of LiBOB (Lithium bis-(oxalate)borate) and 1 M of $LiPF_6$ as the electrolytic solution.

[Embodiment 2] Manufacture of Sodium Rechargeable Battery

The slurry of anode active material was prepared by mixing hard carbon (average particle size of 10 μm, CARBOTRON P, KUREHA CORPORATION), styrene butadiene rubber of the binder and carboxymethyl cellulose of the thickner in water at a weight ratio of 75:15:10. The anode was fabricated by a typical process to coat this slurry of anode active material on Cu foil of the current collector, to dry and to roll.

The slurry of cathode active material was prepared by mixing $Na[Ni_{0.25}Fe_{0.25}Mn_{0.5}]O_2$ of the cathode active material, carbon black of the electrically conductive material and polyvinylidene fluoride of the binder in N-methylpyrrolidone of the solvent at a weight ratio of 85:7.5:7.5. The cathode was fabricated by a typical process to coat this slurry of cathode active material on Al foil of the current collector, to dry and to roll.

A sodium rechargeable battery was manufactured using the cathode, the anode and ethyl methanesulfonate prepared by dissolving 1 M of $NaClO_4$ as the electrolytic solution and adding 2 vol % of fluoroethylene carbonate as the additive.

COMPARISON EXAMPLE 2

Manufacture of Sodium Rechargeable Battery

A sodium rechargeable battery was manufactured in the same manner as in Embodiment 2 except using propyl carbonate prepared by dissolving 2 vol % of fluoroethylene carbonate as the additive and 1 M of $NaClO_4$ as the electrolytic solution.

EXPERIMENTAL EXAMPLE 1

Measurement of Stability of Electrolytic Solution

The result of LSV (linear sweep voltammetry) test for measuring the stability of the electrolytic solution of the lithium rechargeable batteries manufactured in Embodiment 1-1 and Comparison example 1-1 at a high voltage is illustrated in FIG. 1, and the result of LSV (linear sweep voltammetry) test for measuring the stability of the sodium rechargeable battery manufactured in Embodiment 2 at a low voltage is illustrated in FIG. 2.

In FIG. 1, it has been confirmed that the stability of the electrolytic solution was maintained to a higher voltage in the case of an embodiment according to the present invention using an electrolytic solution containing ethyl methanesulfonate as compared to the case of containing propyl carbonate. In addition, in FIG. 2, it has been confirmed that the electrolytic solution does not decompose even at a low voltage but is stably maintained.

EXPERIMENTAL EXAMPLE 2-1

Measurement of Battery Capacity and Lifespan Characteristic of Lithium Rechargeable Battery The evaluation on charge and discharge of the lithium rechargeable batteries of Embodiment 1-1 and Comparison example 1-1 was performed. The battery of Embodiment 1-1 was charged to be 5.3 V and the battery of Comparison example 1-1 was charged to be 5.1 V. After charging, the batteries of Embodiment 1-1 and Comparison example 1-1 were discharged to be 3.5 V. Charge and discharge were conducted under a condition of 0.2C-rate and a temperature of 25° C.

The measurement result of the initial charge and discharge characteristics of the lithium rechargeable batteries manufactured in Embodiment 1-1 and Comparison example 1-1 is presented in Table 1 and the measurement result of the lifespan characteristics thereof at 25° C. and 55° C. is presented in Table 2.

In Table 1, when the battery of Embodiment 1-1 using ethyl methanesulfonate as the solvent of electrolyte and the battery of Comparison example 1-1 using propyl carbonate as in the related art are compared to each other, it has been confirmed that the decomposition of the electrolytic solution does not occur even though the working voltage is raised from 5.1 V to 5.3 V in the case of the battery of Embodiment 1-1 and the discharge capacity thereof is also higher than the discharge capacity of the battery of Comparison example 1-1.

In addition, it has been confirmed from Table 2 that the discharge capacity of Embodiment 1-1 is constantly maintained although the battery is repeatedly charged and discharged at normal temperature of 25° C. as compared to the discharge capacity of Comparison example 1-1. Moreover, it has been confirmed from Table 2 that the discharge capacity of Embodiment 1-1 is five times or more the discharge capacity of Comparison example 1-1 even at a high temperature of 55° C. and is constantly maintained despite repeated charge and discharge. As a result, a lithium rechargeable battery containing the electrolyte according to the present invention is excellent in stability at a high temperature and lifespan characteristics.

TABLE 1

| Initial charge and discharge characteristic of lithium rechargeable battery | | |
|---|---|---|
| | 0.2 C $1^{st}$ discharge | $1^{st}$ Efficiency |
| Embodiment 1-1 (EMS) | 134.5 mAh/g | 79.1% |
| Comparison example 1-1 (PC) | 119.0 mAh/g | 73.4% |

TABLE 2

Lifespan characteristic of lithium rechargeable battery

|  | 25° C. | | | 55° C. | | |
| --- | --- | --- | --- | --- | --- | --- |
|  | 0.2 C $1^{st}$ | 0.2 C $100^{th}$ | 0.2 C retention | 0.2 C $1^{st}$ | 0.2 C $12^{th}$ | 0.2 C retention |
| Embodiment 1-1 (EMS) | 134.5 mAh/g | 126.5 mAh/g | 94.1% | 118.5 mAh/g | 109.3 mAh/g | 92.2% |
| Comparison example 1-1 (PC) | 119.0 mAh/g | 105.1 mAh/g | 88.3% | 120.8 mAh/g | 2.7 mAh/g | 2.2% |

MODE FOR CARRYING OUT THE INVENTION

EXPERIMENTAL EXAMPLE 2-2

Measurement of Battery Capacity and Lifespan Characteristic of Lithium Rechargeable Battery The evaluation on charge and discharge of the lithium rechargeable batteries of Embodiment 1-2 and Comparison example 1-2 manufactured above was performed in the same manner as in Experimental example 2-1 above. The initial charge and discharge curve of the battery manufactured in Embodiment 1-2 at 25° C. and the initial charge and discharge curve thereof at 55° C. are illustrated in FIG. 3A and FIG. 3B in relation between voltage and capacity, respectively.

The batteries of Embodiment 1-2 and Comparison example 1-2 were charged to be 5.0 V. After charging, the batteries of Embodiment 1-2 and Comparison example 1-2 were discharged to be 3.5 V. Charge and discharge were conducted under a condition of 0.2C-rate and a temperature of 25° C.

In FIG. 3B, when the battery of Embodiment 1-2 using ethyl methanesulfonate as the non-aqueous solvent and the battery of Comparison example 1-2 using propyl carbonate as in the related art are compared to each other on the initial charge and discharge curve of the battery, it has been confirmed that the discharge capacity of the battery of Embodiment 1-2 is higher than the discharge capacity of the battery of Comparison example 1-2 at 55° C.

In FIG. 4, with regard to the lifespan characteristics, a decrease in capacity of the battery of Embodiment 1-2 is less as compared to that of Comparison example 1-2 although the battery is repeatedly charged and discharged even at a high temperature of 55° C., and thus the battery of Embodiment 1-2 is excellent in stability at a high temperature.

EXPERIMENTAL EXAMPLE 3

Measurement of Battery Capacity and Lifespan Characteristic of Sodium Rechargeable Battery The initial charge and discharge characteristics and lifespan characteristics of sodium rechargeable batteries of Embodiment 2 and Comparison example 2 manufactured above were measured and the results are illustrated in FIG. 5 and FIG. 6 respectively.

The battery of Embodiment 2 was charged to be 4.7 V and the battery of Comparison example 2 was charged to be 4.3 V. After charging, the batteries of Embodiment 2 and Comparison example 2 were discharged to be 1.5 V. Charge and discharge were conducted under a condition of 0.2C-rate and a temperature of 25° C.

In FIG. 5, when the battery of Embodiment 2 using ethyl methanesulfonate as the non-aqueous solvent according to an embodiment of the present invention and the battery of Comparison example 2 using propyl carbonate as the non-aqueous solvent are compared to each other, it has been confirmed that the discharge capacity of the battery of Embodiment 2 is higher than the discharge capacity of the battery of Comparison example 2 by 30% at 25° C.

In FIG. 6, with regard to the lifespan characteristics, the discharge capacity the battery of Embodiment 2 is higher and a decrease in capacity thereof is less as compared to Comparison example 2 although the battery is repeatedly charged and discharged.

Exemplary embodiments of the present invention have been explained with reference to accompanying drawings, however, it will be understood that the technical construction of the present invention described in detail may be implemented in other specific forms without changing the spirit or principles of the present invention by those skilled in the art. Accordingly, it should be understood that the exemplary embodiments described above are illustrative in all aspects and are not intended to limit the present invention. In addition, the scope of the present invention is defined in the appended claims rather than the above detailed description. Moreover, it should be interpreted that various alternatives, modifications, and other embodiments derived from the spirit and scope of the present invention and their equivalents are included in the present invention.

INDUSTRIAL APPLICABILITY

The rechargeable battery according to the present invention provides a rechargeable battery including a cathode; a carbon-based anode; and a non-aqueous electrolytic solution containing an electrolytic salt and an alkyl methanesulfonate as a solvent for dissolving the electrolytic salt.

The rechargeable battery according to the present invention contains an alkyl methanesulfonate as a solvent for dissolving an electrolytic salt and thus exhibits high energy storability and a long lifespan effect even in a high-voltage and high-temperature environment.

What is claimed is:

1. A rechargeable battery comprising:
   a cathode including a sodium ion intercalation compound;
   a carbon-based anode; and
   a non-aqueous electrolytic solution containing an electrolytic salt and an alkyl methanesulfonate as a solvent for dissolving the electrolytic salt,
   wherein the electrolytic salt is dissolved in the alkyl methanesulfonate at a concentration of 0.5 M to 1.2 M.

2. The rechargeable battery of claim 1, wherein the alkyl methanesulfonate is one or more selected from the group consisting of methyl methanesulfonate, ethyl methanesulfonate, propyl methanesulfonate, butyl methanesulfonate and pentyl methanesulfonate.

3. The rechargeable battery of claim 1, wherein the cathode has a structure selected from the group consisting of a layered structure, a spinel structure, an olivine structure and a nasicon structure.

4. The rechargeable battery of claim 1, wherein the cathode is selected from the group consisting of chemical formulas of:

$Na_aNi_{1-b-c}Co_bX_cO_{2-\alpha}T_\alpha$ ($0.30 \leq a \leq 1.3$, $0 \leq b \leq 1.0$, $0 \leq c \leq 0.1$, $0 \leq \alpha \leq 2$);

$Na_aNi_{1-b-c}Mn_bX_cO_{2-\alpha}T_\alpha$ ($0.30 \leq a \leq 1.3$, $0 \leq b \leq 1.0$, $0 \leq c \leq 0.1$, $0 \leq \alpha \leq 2$);

$Na_aNi_bCo_cMn_dG_eO_2$ (0.30≤a≤1.3, 0≤b≤1.0, 0≤c≤1.0, 0≤d≤1.0, 0≤e≤0.1);
$Na_aCoG_bO_2$ (0.30≤a≤1.3, 0≤b≤0.1);
$Na_aMn_{1-b}G_bO_2$ (0.30≤a≤1.3, 0≤b≤0.1);
$Na_aMn_2G_bO_4$ (0.30≤a≤1.3, 0≤b≤0.1);
$Na_aMn_{1-g-f}G_gX_fPO_4$ (0.90≤a≤1.3, 0≤g≤1.0, 0≤f≤1.0);
$Na_{(3-f)}J_2(PO_4)_3$ (0≤f≤2);
$Na_{(3-f)}Fe_2(PO_4)_3$ (0≤f≤2); and
$Na_aFe_{1-g}G_gX_fPO_4$ (0.90≤a≤1.3, 0≤g≤1.0, 0≤f≤1.0), wherein X is selected from the group consisting of Al, Ni Co, Mn, Cr, Fe, Mg, Sr, V, a rare earth element and any combination thereof;

T is selected from the group consisting of F, S, P and any combination thereof;

G is selected from the group consisting of Al, Cr, Mn, Fe, Mg, La, Ce, Sr, V and any combination thereof;

Z is selected from the group consisting of Cr, V, Fe, Sc, Y and any combination thereof; and J is selected from the group consisting of V, Cr, Mn, Co, Ni, Cu and any combination thereof; and the electrolytic salt is one or more selected from the group consisting of $NaClO_4$, $NaBF_4$, $NaAlCl_4$, $NaSbF_6$, $NaPF_6$, NaSCN, $NaCF_3SO_3$, $NaCF_3CO_2$, $NaAsF_6$, $NaB_{10}Cl_{10}$, NaCl, NaBr and NaI.

5. The rechargeable battery of claim 1, further comprising:

an additive selected from the group consisting of fluoroethylene carbonate ($C_3H_3FO_3$), vinyl carbonate, vinyl benzoate, vinyl butyrate, vinyl hexanoate, vinyl crotonate, vinyl pivalate, t-difluoroethylene carbonate (DFEC) and ethylene sulfite (ES).

6. The rechargeable battery of claim 1, wherein the non-aqueous electrolytic solution consists of the electrolytic salt and the alkyl methanesulfonate.

* * * * *